United States Patent Office 3,108,995
Patented Oct. 29, 1963

3,108,995
METHOD OF MODIFYING TYPE A GELATIN AND PRODUCT THEREOF
Dee Tourtellotte and Ernest M. Marks, Haddonfield, N.J., assignors to Charles B. Knox Gelatine Co., Inc., a corporation of New York
No Drawing. Filed Mar. 1, 1957, Ser. No. 643,247
21 Claims. (Cl. 260—117)

This invention relates to new and useful improvements in the manufacture of gelatin products and more particularly relates to the production of a modified type A gelatin, the modified type A gelatin being particularly useful alone or in mixtures to make capsules, marshmallow foam, and other gelatin products.

Gelatin is a product obtained by the partial hydrolysis of collagen derived from the skin, white connective tissue, and bones of animals. It is a derived protein composed of various amino acids linked between adjacent imino and carbonyl groups to provide the classical peptide bond. The amino acid combinations in gelatin give it amphoteric properties, which are responsible for varying isoelectric values, depending somewhat upon the methods of processing. Important physical properties of gelatin such as solubility, swelling, and viscosity show minimum values at the isoelectric point. Thus the standard testing procedure for the isoelectric range is to take dilute 1.5% water solutions of gelatin, adjust a series of samples over the desired pH range at 0.1 pH intervals and then observe the samples after refrigeration for maximum cloudiness.

Type A gelatin results from acid pretreatment (swelling of the raw material in the presence of acid) and is generally made from frozen porkskins which are treated in dilute acid (HCl, $H_2SO_3$, $H_3PO_4$, or $H_2SO_4$) at a pH of 1 to 2 for 10 to 30 hours, after which it is water washed to remove excess acid followed by extraction and drying in the conventional manner. Type B gelatin results from alkali pretreatment (swelling of the raw material in the presence of an alkali) and is generally made from ossein or hide stock which is treated in saturated lime water for 3 to 12 weeks, after which the lime is washed out and neutralized with acid. The adjusted stock is then hot water extracted and dried as with type A. Dry bone is cleaned, crushed, and treated for 10 to 14 days with 4 to 7% HCl to remove the minerals (principally tricalcium phosphate) and other impurities before reaching the stage known as ossein. Dry bone is 13 to 17% gelatin whereas dry ossein is 63 to 70% gelatin.

Type A gelatin is characterized by an isoelectric zone between pH 7 and 9, whereas type B gelatin has an isoelectric zone between pH 4.7 and 5.0. Relative to each other, type A gelatin has less color, better clarity, more brittleness in film form and is faster drying than type B.

Due to the fact that bone used in the production of ossein is usually imported whereas frozen porkskins are obtained from domestic sources and further the total treatment period of type A is 1 to 2 days compared to 5 to 12 weeks for type B, the type A gelatin is produced with less difficulty and generally less cost. Due both to cost factors and the peculiar properties of the two gelatin types, the food, pharmaceutical, photographic, and other industries use both type A and type B gelatin. In some applications in each industry, the types may be used interchangeably and in many others it presents technical problems.

There are known instances where mixtures of the two types give the best results. However, the widely separated ranges for respective isoelectric values of type A and type B gelatin have limited their usefulness under conditions where it would be economically and technically desirable to use mixtures of the two types of gelatin in any or all proportions. This limitation is due to the phenomenon of coacervation in the interisoelectric pH range existing between the normal isoelectric pH range of 4.7–5.0 for type B gelatin and the broad isoelectric pH range of 7.0–9.0 for type A gelatin. Whereas, either type A or type B gelatin alone will give clear solutions in this interisoelectric region, a cloudy opalescent solution is obtained when dilute solutions (1.5%) of a mixture of the two types in ratios of 1:5 to 5:1 are adjusted between pH 6.0 to 7.0. This incompatibility of type mixtures also adversely affects certain physical properties of dried gelatin films as used in the production of hard gelatin capsules for dispensing and storing medicaments.

The sensitive stability of gelatin in its ability to form a gel and its viscosity is important to the manufacturer and user. Generally the viscosity decreases markedly on prolonged heating at moderate temperatures, e.g. at 60° C., the temperature at which standard viscosity tests are run.

It is an object of this invention to produce a modified type A gelatin that is completely compatible over any range of concentrations with conventional type B gelatin.

It is another object of this invention to produce a modified type A gelatin that may be used alone or in admixture with conventional type A or type B gelatin.

It is an additional object of this invention to produce a modified type A gelatin or mixture thereof for incorporation into marshmallow formulations that will impart superior whipping qualities and stability to the marshmallow foam.

It is a further object of this invention to produce a modified type A gelatin or mixture thereof for the making of improved hard gelatin capsules that are tougher, lighter in color, clearer, less frangible and have less defects during the making of the capsules.

It is also an object of this invention to produce a gelatin of improved viscosity stability or even increased viscosity on prolonged heating.

We have found that if type A gelatin is modified by controlled acylation with a polycarboxylic acid compound selected from the group consisting of succinic, maleic, phthalic, citraconic, itaconic and aconitic anhydrides and succinyl and fumaryl chlorides to lower the isoelectric point within the pH range of 4.0 to 5.5, the modified type A has many of the desirable properties of type B but not undesirable properties thereof so as to have complete isoelectric compatibility in all proportions with type B. The modified type A retains some or all of the color and clarity advantages of type A but has flexibility, drying and isoelectric characteristics similar to type B.

We have further found that treatment of type A gelatin with maleic anhydride not only gives a modified product with the above characteristics but also one in which the viscosity increases on prolonged heating rather than decreasing as it does with conventional gelatins.

The pH range of the acylation reaction should be from 3.0 to 8.5 with a temperature range of 25 to 90° C. but 40 to 60° is preferred for high grade materials. Starting with a given amount of reagents, the reaction is complete when the pH of the reaction mixture reaches a stable equilibrium. We have found that about 2 to 4% of the polycarboxylic acid compound based on dry weight of gelatin will generally bring the isoelectric range of the modified type A gelatin within the desired range, depending somewhat upon the particular compound. However, 1 to 10% of the compound may be sometimes necessary to bring the isoelectric point of modified type A into the pH range of 4.0 to 5.5 which has been found to be workable. We are primarily interested in the ultimate isoelectric point, rather than the amount of polycarboxylic acid compound necessary to reach the desired point. Although amounts outside of the 1 to 10% range may be used, the end products are generally outside the desirable isoelectric range for our purposes.

We have found that the modified type A gelatin may be freely mixed with type B in any proportion to lower the cost and/or improve the properties of the end product for a particular use, that the modified type A may be mixed with conventional type A in concentrated solutions for making improved hard capsules, and that the modified type A may be used alone or in mixtures with types A or B to give superior hard capsules and marshmallow products. The modified type A gelatin derived from maleic anhydride may be mixed with any other gelatin to stabilize the conventional viscosity loss occurring on prolonged heating at moderate temperatures.

The polycarboxylic acid compounds used herein will hydrolyze during the reaction to form some polycarboxylic acid which does not enter the reaction and the acid or its salt will remain in the modified type A gelatin reaction mixture. In certain food formulations, e.g., flavored gelatin dessert mixtures and marshmallow confections, it is desirable to incorporate organic acids and their sodium salts to enhance certain characteristics of the products. For these type applications, the polycarboxylic acids or their salts may be left in the modified type A gelatin and the reaction mixture adjusted to the desired pH, dried and granulated in the usual manner. In other food formulations and pharmaceutical products, e.g., hard gelatin capsules, it is desirable for the gelatin to be free of such acids and salts. In these instances, we remove the by-products either by dialysis or by suitable anion and cation exchange resins, before adjustment of the pH, drying and granulating of the end product.

In the manufacture of hard gelatin capsules for pharmaceutical purposes the usual procedure calls for a mixture of type A and type B gelatin in about equal amounts. Relatively concentrated solutions of the gelatin types in water are used (30 to 40% gelatin), from which the capsules are made by an automatically controlled dipping operation using corrosion-resistant metal pins. The cylindrical, closed-end films formed on the pins are then air-dried, the dried pieces are cut to size and are finally stripped off for subsequent filling with medicament. Gelatin mixtures of types A and B in 30 to 40% water solutions do not show the isoelectric haze mentioned above and the dried films resulting therefrom are generally as free from isoelectric cloudiness as films made from the individual components.

Type B gelatin can be used alone in the capsule dipping operation. It is, however, not so used for several reasons, the most important of which are its relatively higher cost and the rather dark and unattractive capsules that result therefrom. To overcome these objectionable features the capsule maker incorporates type A gelatin into his capsule formulations as mentioned above. This enables him to eliminate a considerable amount of the more costly type B gelatin and at the same time the color and general appearance of his product are improved, since it is a well known fact that type A gelatin is decidedly lighter in color and less hazy in film form than is type B gelatin. It has not, however, proven feasible to use indefinitely increasing percentages of type A in the capsule blend. This is because type A gelatin in film form is appreciably more brittle than type B gelatin, and this brittleness factor, if not controlled, can result in production losses. This brittleness factor is not thoroughly understood but is believed to be due in part to the fact that type A films dry out faster than do type B films, which would, of course, adversely influence the mechanical operations. Since these two specific properties are of vital importance in capsule manufacture, it is apparent that the use of type A gelatin must be somewhat limited.

We have found that the mild controlled acylation of type A gelatin as described above overcomes some of the difficulties just mentioned. In the first place, the acylated product has drying characteristics seemingly identical with those of normal type B gelatin. Secondly, its color and clarity are much better than those of type B and generally comparable with those of type A gelatin. Therefore, replacement of type B gelatin with our modified type A gelatin results in capsules of improved color and clarity. Moreover, there are decided improvements in capsule yields, in smooth operation and flexibility when compared with those made with the conventional type B-type A mixture.

Since the drying rate and brittleness of the gelatin films are interrelated and extremely important for making hard capsules, we have devised a method of evaluating the drying characteristics. The gelatin may be examined either in film form or in the finely ground state. Although working with films probably gives results more in agreement with those experienced in actual practice, the manipulations involved are more complicated and time-consuming than those used with ground samples. In addition, duplication of results is more readily obtained with ground samples. In order to avoid the presence of coarse particles in the samples, they were first screened through a standard wire sieve (U.S. No. 35).

A sample of screened gelatin (1.6 to 1.8 grams) is weighed on an analytical balance into a ground-glass stoppered weighing bottle (50 mm. high x 40 mm. I.D.). This sample is then exposed for 100 to 120 hours in an atmosphere of 75% relative humidity at 26 to 27° C. during which time the gelatin increases in weight due to moisture pick-up. The hydrated sample is then exposed for exactly 48 hours in an atmosphere of 32% relative humidity at 26 to 27° C. During this period the gelatin loses weight on account of its tendency to reach equilibrium with the relatively low humidity in which it is exposed. This loss in moisture appears to be a reliable measure of the drying characteristics of the gelatin. Finally the sample is heated at 104 to 106° C. for $20 \pm 0.5$ hours to remove all moisture. From the sample weight at each stage of this process one can calculate the corresponding moisture content. The loss of moisture resulting in exposing the hydrated sample in 32% relative humidity is a measure of the drying characteristics of the gelatin and it has been designated as "percent drying." It can be calculated as follows:

$$\text{Percent drying} = \frac{(\text{percent } H_2O \text{ at } 75\% \text{ R.H.}) - (\text{percent } H_2O \text{ at } 32\% \text{ R.H.})}{(\text{percent } H_2O \text{ at } 75\% \text{ R.H.})} \times 100$$

Type A pharmaceutical gelatin has values of 27 to 31%, whereas type B pharmaceutical gelatin has values of 19 to 24% using this method.

The following examples will further demonstrate our invention:

EXAMPLE 1

2180 parts by weight of type A porkskin gelatin, dispersed in water in 10% concentration at 50° C., were adjusted to pH 6.0 by the addition of 28.6 parts by weight of 97% sodium hydroxide. Efficient mechanical agitation of the gelatin liquor was maintained throughout. To this adjusted mixture was next added gradually over a period of about one-half hour 50 parts by weight of powdered 99% succinic anhydride. This amount of anhydride was equivalent to 2.29% by weight of the gelatin. The reaction with succinic anhydride brings about a lowering of the pH and in order to hold the pH at a relatively constant value (5.5 to 6.0), sufficient sodium hydroxide (37.5 parts by weight) was added simultaneously with the anhydride. It is preferable in processing a modified type A to be used in gelatin capsules that the pH be maintained below 7.0 and the temperature below 55° C. to avoid hydrolysis of the gelatin. As soon as all of the anhydride had been added and had completely reacted, as judged by constancy of pH and complete disappearance of solid particles, the gelatin mixture was passed in the conventional manner through ion exchange resins to remove all extraneous ionic matter. The effluent gelatin liquor was at pH 4.9 to 5.0 (at 49° C. without water dilution). Sufficient sodium hydroxide (4.24 parts by weight) was then added to the liquor to adjust the pH upwards to 5.5 (49° C., undiluted). The treated gelatin was finally recovered in the conventional manner.

Tests on the initial porkskin gelatin, its modified product and typical pharmaceutical types A and B gelatin are given in Table 1.

*Table 1*

|  | Original Type A | Modified Type A | Typical | |
|---|---|---|---|---|
|  |  |  | Type A | Type B |
| Bloom (Jelly Strength) | 260 | 273 | 270 | 235 |
| M.P. Viscosity (6⅔ percent, 60° C.) | 52.6 | 44.9 | 50.0 | 47.0 |
| pH (1½ percent, 25° C.) | 4.11 | 5.73 | 4.90 | 5.70 |
| Color (1½ percent, 25° C.) | 34 | 24 | 25 | 67 |
| Clarity (1½ percent, 25° C.) | 13 | 9 | 8 | 20 |
| Percent Viscosity Loss (12½ percent, 60° C., 17 hours) | 46.6 | 14.6 | 23.0 | 19.0 |
| Percent Ash | 0.96 | 0.63 | 0.30 | 0.80 |
| Percent Moisture | 10.00 | 8.27 | 8.90 | 9.50 |
| Isoelectric Haze pH, Range | 6.0 to 8.0 | 4.6 to 5.0 | 6.0 to 8.0 | 4.7 to 5.2 |
| Isoelectric Haze pH, Maximum | 7.0 to 8.0 | 4.7 to 4.9 | 7.0 to 8.0 | 4.8 to 5.0 |
| Drying Rate (Percent) | 30.0 | 24.4 | 27 to 30 | 21 to 25 |

All of the tests are standard tests used in the gelatin industry with the exception of the drying rate which was explained hereinbefore.

The above described modified type A gelatin could be blended with type B gelatin in all proportions and the resulting blends showed isoelectric haze points in the same region as that of type B. An extended test run on a capsule-making machine with a 50:50 blend of modified type A and conventional type A gelatin produced capsules with a cutting loss percentage less than 5.0% as compared with an average loss up to 10% from a 50:50 blend of conventional types A and B gelatin. Moreover, the capsules from the blend containing our modified type A gelatin were appreciably tougher, less frangible, lighter in color, clearer and exhibited more sparkle than those made from the regular blend of gelatin. These advantages can be noted from consideration of the data in the above table. For example, consider the color and clarity measurements, which were carried out in a standard, photoelectric type of colorimeter (Klett-Summerson) using the proper selection of color filters supplied with the instrument. The reported values are on a logarithmic scale which means wider spreads in actual color and clarity than the readings indicate. A 50:50 blend of the modified A type with conventional type A would have almost the same color and clarity as the type A gelatin alone which, of course, would mean that the capsules produced therefrom would be of exceptionally light color (25), high clarity (9) and sparkle. A 50:50 blend of the regular types A and B, however, would give capsules appreciably darker in color (about 46) and less clear (about 14). Next, consider the viscosity loss values in the table. As is well known in the gelatin art, constancy of viscosity under working conditions such as met in capsule making has never been realized. Viscosity loss signifies hydrolysis of the gelatin into lower molecular weight substances, such as proteases and peptones and too rapid accumulation of these substances in the capsule dipping solution presents difficulty to the capsule maker in that he will eventually accumulate a mixture which will not gel evenly and firmly on the capsule pins. As indicated in the table, the viscosity loss value of our modified type A gelatin is only 14.6% while that of a regular type B gelatin averages about 19% and values as high as 25% are sometimes encountered. A 50:50 blend of our modified type A with conventional type A would, therefore, be 18.8%, whereas a 50:50 blend of regular types A and B would be 21%. The improvement in stability is quite apparent and will be greatly appreciated by the capsule maker. Furthermore, capsules may be made by using modified type A alone or a mixture of modified type A and regular type B.

EXAMPLE 2

A 10% dispersion of type A porkskin gelatin in water was deanionized by a suitable exchange resin in the usual way, the resulting liquor having a pH of 10.0 at 45° C. 2944 parts by weight of this deanionized mixture (i.e., 294.4 parts of gelatin) were treated at 45° C. under efficient mechanical stirring with 6.88 parts by weight of powdered 99% succinic anhydride. This quantity of anhydride was equivalent to 2.34% by weight of the gelatin. No alkaline reagent was added during this reaction and the pH of the medium fell rapidly to a final, steady value of 5.63. The reaction time was 15 minutes. The modified type A was recovered in the conventional way. Test results together with those on the original type A gelatin, a type B gelatin and a blend of the modified type A with the type B are given in Table 2.

*Table 2*

|  | Original Type A | Modified Type A | Type B | 20% Modified A, 80% Type B |
|---|---|---|---|---|
| Bloom | 267 | 250 | 229 | 231 |
| M.P. Viscosity | 52.3 | 53.6 | 48.9 | 48.3 |
| pH | 4.58 | 5.95 | 5.69 | 5.79 |
| Color | 39 | 50 | 78 | 73 |
| Clarity | 14 | 24 | 24 | 24 |
| Percent Viscosity Loss |  | 18.4 | 16.5 | 16.6 |
| Percent Ash | 1.20 | 0.84 | 1.02 | 0.91 |
| Percent Moisture | 10.00 | 10.25 | 9.43 | 9.83 |
| Isoelectric Haze pH, range | 6.0 to 8.0 | 4.5 to 5.1 | 4.7 to 5.1 | 4.6 to 5.1 |
| Isoelectric Haze pH, maximum | 7.0 to 8.0 | 4.6 to 4.8 | 4.8 | 4.8 to 5.0 |
| Drying Rate |  | 27.4 | 25.0 | 24.9 |

This modified type A blended with type B gelatin in all proportions with no change is isoelectric haze pH from that of the type B. The product would, however, be unsuited for admixture alone with type A gelatin in capsule production mainly because its drying characteristics are appreciably higher at 27.4% than the normal type B gelatin range of 21 to 25%. Furthermore, it is not as light in color as the modified gelatin of Example 1 or normal type B. However, it could be used as a supplementary supply of type B gelatin alone or in admixture with regular type B in case of a shortage of the latter, such as might be experienced during a national emergency or where economy dictates a cheaper product.

EXAMPLE 3

It is possible, however, to make an acylated product with slower drying characteristics by the method used in Example 2 merely by completely deionizing the material immediately after reaction with the anhydride, as illustrated in the present example.

A 10% dispersion of type A porkskin gelatin in water was deanionized by an exchanger, the pH of the effluent liquor being 9.96 at 43° C. 1740 parts by weight of this liquor were then treated at 45° C. with 4 parts by weight of powdered 99% succinic anhydride. This amount of anhydride corresponded to 2.3% by weight of the gelatin. The pH of the mixture decreased to 5.4 at the end of the reaction. The acylated mixture was next completely deionized by suitable exchange resins, the deionized liquor having a pH value of 5.15. The liquor was then adjusted to pH 5.5 with 0.15% sodium hydroxide and the finished product was recovered in the usual way. Table 3 gives the properties of the modified type A and those of the original type A gelatin.

Table 3

|  | Original Type A | Modified Type A |
|---|---|---|
| Bloom | 279 | 259 |
| M.P. Viscosity | 54.5 | 51.5 |
| pH | 4.41 | 5.77 |
| Color | 35 | 49 |
| Clarity | 12 | 22 |
| Percent Viscosity Loss |  | 19.0 |
| Percent Ash |  | 0.62 |
| Percent Moisture | 10.00 | 10.26 |
| Isoelectric Haze pH, range | 6.0 to 8.0 | 4.5 to 5.1 |
| Isoelectric Haze pH, max | 7.0 to 8.0 | 4.8 |
| Drying Rate |  | 25.5 |

The drying rate of this modified type A gelatin is just about the same as that of a typical type B gelatin. However, the modified products made by the method employed in Examples 2 and 3 are not as light in color and low in turbidity as are products produced by the method used in Example 1, due evidently to the fact of the higher pH reached after deanionization which causes some degradation and resulting higher color and turbidity. Even so, the modifying reaction does not take place to an appreciable extent at this higher pH because the pH is immediately lowered in adding the succinic anhydride or similar reactant.

EXAMPLE 4

1050 parts by weight of a 12½% dispersion of type A porkskin gelatin in water were adjusted with 2.42% sodium hydroxide to pH 8.2 at 56° C. To this liquor was then added over a half-hour period sufficient 99% succinic anhydride to lower the pH of the medium to 5.0. The amount of anhydride necessary corresponded to 1.73% by weight of the gelatin. The modified type A was then recovered in the usual manner. Tests on the product together with those on the original type A gelatin are given in Table 4.

Table 4

|  | Original Type A | Modified Type A |
|---|---|---|
| Bloom | 250 | 246 |
| M.P. Viscosity | 61.1 | 53.6 |
| pH | 3.89 | 5.11 |
| Color | 45 | 107 |
| Clarity | 17 | 53 |
| Isoelectric Haze pH, range | 6.0 to 8.0 | 4.5 to 7.1 |
| Isoelectric Haze pH, Max | 7.0 to 8.0 | 4.7 to 5.1 |

The modified type A, when used in a typical marshmallow formulation, imparted to the mixture superior whipping qualities, resulting in a lower density of 2.94 lbs. per gallon compared with 3.27 lbs. per gallon for marshmallow made from the untreated type A gelatin. The marshmallow mixture made with modified type A gelatin showed improved texture and stability and also faster setting qualities. The high color of the modified type A here is attributable to the original high pH adjustment to 8.2 and also the presence of succinates during the drying stage. The inferior clarity is due to the sodium succinate remaining (not deionized) which tends to buffer the modified type A near its isoelectric point, i.e., its pH is 5.11 and the maximum isoelectric haze at pH 4.7 to 5.1. However, the color and clarity are not particularly important features in manufacturing marshmallow confections.

EXAMPLE 5

It is possible to first mix the type A and type B gelatin and then modify the type A so that it will be compatible with type B.

3,000 parts by weight of a 10% solution of a 50:50 mixture of types A and B gelatin were adjusted to pH 5.6 by the addition of 0.19% by weight of sodium hydroxide (based on weight of gelatin). The temperature of the adjusted solution was 50° C. To this solution was next added 3.45 parts by weight of succinic anhydride (1.15% by weight of gelatin) in 5 minutes simultaneously with 0.88% sodium hydroxide to hold the pH of the medium at 5.5 to 6.0. The treated solution was then deionized by ion exchange resins. The treated gelatin was recovered in the usual way.

The results of tests on the initial 50:50 blend and the treated gelatin are shown in Table 5.

Table 5

|  | Original Blend | Treated Blend |
|---|---|---|
| Bloom | 223 | 219 |
| M.P. Viscosity (6⅔% Solution) | 41.3 | 41.8 |
| M.P. Viscosity (12½% Solution) | 174.4 | 176.0 |
| Percent Viscosity Loss | 20.7 | ¹ 30.0 |
| pH | 5.4 | 5.0 |
| Percent Moisture | 11.50 | 10.01 |
| Isoelectric Haze pH (range) | 4.7 to 8.0 | 4.6 to 5.0 |
| Isoelectric Haze pH (maximum) |  | 4.8 to 4.9 |

¹ Estimated viscosity loss for the product at pH 5.4 would approximate 25%.

It is apparent that the 50:50 blend was modified to bring the isoelectric pH range to a relatively sharp point coinciding within the range of a type B gelatin.

EXAMPLE 6

The controlled modification of type A gelatin by means of polycarboxylic acid anhydrides (e.g., succinic anhydride) is considered accomplished for the purposes of our invention when the isoelectric point has been lowered within the pH range of 4.0 to 5.5. During the addition of the anhydride to the gelatin there are at least two reactions taking place, i.e., (1) reaction of the anhydride with the gelatin to bring about the isoelectric shift and (2) hydrolysis of the anhydride to succinic acid by the water which is, of course, present. It is our opinion that not over one-third of the anhydride reacts with the gelatin, the remainder being hydrolyzed to succinic acid which, as we know from other experimentation, does not effect any appreciable shift in the isoelectric region.

We have reacted several different samples of type A gelatin in water solution with varying quantities of succinic anhydride at a reaction pH range of 5 to 6 in the temperature region of 40 to 50° C. to determine the quantity of succinic anhydride required for the desired isoelectric shift. The preferred quantity of succinic anhydride is about 2 to 3% of the weight of gelatin as will be noted from Table 6.

Table 6

| Percent Anhydride | Isoelectric Range | Haze pH, Maximum |
|---|---|---|
| 0 | 6.4–8.1 | 7.0–8+ |
| 0.5 | 4.8–4.6 | 5.9–6.6 |
| 1.0 | 4.8–8.0 | 5.1–6.4 |
| 1.5 | 4.6–7.0 | 4.9–5.4 |
| 2.0 | 4.6–5.8 | 4.8–5.1 |
| 3.0 | 4.6–5.0 | 4.7–4.9 |
| 4.0 | 4.6–5.0 | 4.6–4.8 |
| 5.0 | 4.4–5.0 | 4.5–4.7 |
| 10.0 | 4.0–4.9 | 4.3–4.4 |

It is apparent that the amount of succinic anhydride required to bring about modification of the type A gelatin to the desired isoelectric point within the pH range of 4.0 to 5.5 is anywhere from 1.5 to 10% or more but that the higher amounts of succinic anhydride have relatively less effect. We prefer to use from 2 to 3% and find 2.3% gives good results.

EXAMPLE 7

1900 parts by weight of a 10% solution of type A porkskin gelatin in water were adjusted to pH 5.6 by the addition of 1.21% of sodium hydroxide (based on weight of gelatin). The temperature of the adjusted solution was 45° C. To this solution was then added 7.6 parts by weight of succinyl chloride (4% by weight of gelatin) over a period of 15 minutes simultaneously with sufficient sodium hydroxide to maintain the pH of the medium at 5.5 to 6.0 (4.1% sodium hydroxide was required. The treated solution was next deionized by ion exchange resins, adjusted to pH 5.5 by NaOH (0.17%) and the modified product was recovered in the usual way. Tests on the initial type A gelatin and the modified product were as follows:

*Table 7*

|  | Original Type A | Modified Type A |
|---|---|---|
| Bloom | 260 | 261 |
| M.P. Viscosity (6⅔% Solution) | 52.6 | 48.0 |
| M.P. Viscosity (12½% Solution) |  | 206.5 |
| Percent Viscosity Loss |  | 16.7 |
| pH (1½% Solution) | 4.11 | 5.68 |
| Percent Moisture | 10.00 | 12.20 |
| Percent Ash | 0.96 | 0.41 |
| Isoelectric Haze pH, range | 6.0 to 8.0 | 4.6 to 5.1 |
| Isoelectric Haze pH, max | 7.0 to 8.0 | 4.8 to 4.9 |

It is apparent that the use of succinyl chloride brought about the isoelectric point shift to the desired pH range. We found that 4% of succinyl chloride gave equivalent results to 2.3% of succinic anhydride although the molecular weight equivalency would be 3.57 to 2.3%. This might indicate that the chloride hydrolyzes at a higher rate than the anhydride. When we used 3.57% of chloride, the isoelectric pH range was 4.9 to 5.3 with a maximum haze at pH 5.0 to 5.2. The preferable range of succinyl chloride is 3.5 to 5%.

EXAMPLE 8

400 parts by weight of a 13.7% solution of type A porkskin gelatin in water were adjusted to pH 5.6 at 50° C. by the addition of sodium hydroxide (1.69% by weight of the gelatin). To this adjusted solution was then added over a half-hour period 1.88 parts by weight of phthalic anhydride (3.41% by weight of the gelatin). We find 3 to 4% of phthalic anhydride to be the preferable range. During the addition of the anhydride the pH of the medium was maintained at 5.5 to 6.0 by the simultaneous addition of sodium hydroxide, 2.1% of the weight of gelatin being required. The reaction temperature was maintained at 45 to 50° C. The treated gelatin solution was next completely deionized by ion exchange resins and the effluent was then adjusted to pH 5.5 by the addition of 0.30% of sodium hydroxide. The finished product was finally recovered by conventional means and tested in the usual manner, results of which are shown in the following Table. As will be noted, phthalic anhydride brought about an isoelectric point shift to the desired pH range.

*Table 8*

|  | Original Type A | Modified Type A |
|---|---|---|
| Bloom | 260 | 249 |
| M.P. Viscosity (6⅔% Solution) | 52.6 | 45.2 |
| Percent Viscosity Loss |  | 16.1 |
| pH | 4.11 | 5.93 |
| Percent Ash | 0.96 | 0.50 |
| Percent Moisture | 10.00 | 9.58 |
| Isoelectric Haze pH, range | 6.0 to 8.0 | 4.7 to 5.1 |
| Isoelectric Haze pH, max | 7.0 to 8.0 | 4.8 to 5.1 |

EXAMPLE 9

1900 parts by weight of a 10% solution of type A porkskin gelatin in water were adjusted to pH 6.0 at 45° C. by the addition of sodium hydroxide (1.16% by weight of the gelatin). To this adjusted solution was then added over a 15 minute interval 4.28 parts by weight of maleic anhydride (2.25% of the gelatin). We find 2 to 3% of maleic anhydride to be the preferable range. During this addition the pH of the medium was maintained at 5.5 to 6.0 by the simultaneous addition of sodium hydroxide, 1.35% of the weight of the gelatin being required. The reaction temperature was held at 45 to 50° C. The treated gelatin solution was next completely deionized by ion exchange resins in the usual manner, the effluent liquor being finally adjusted to pH 5.5 by the addition of sodium hydroxide (0.2%). The finished product was then recovered and tested in the usual way, the results being outlined in the following table.

*Table 9*

|  | Original type A | Modified type A |
|---|---|---|
| Bloom | 260 | 274 |
| M.P. viscosity (6⅔% solution) | 52.6 | 51.3 |
| M.P. viscosity (12½% solution) |  | 242.9 |
| Percent viscosity loss |  | [1] +11.8 |
| pH | 4.11 | 5.85 |
| Percent ash | 0.96 | 0.32 |
| Percent moisture | 10.00 | 8.69 |
| Isoelectric haze pH, range | 6.0 to 8.0 | 4.8 to 5.3 |
| Isoelectric haze pH, max | 7.0 to 8.0 | 4.9 to 5.1 |

[1] Gain.

Upon considering these test results it is apparent that the shift in isoelectric pH values has been accomplished. In another respect, however, the product is quite different from that obtained by modification with succinic anhydride, succinyl chloride or phthalic anhydride. This difference is manifested by the fact that the product undergoes no loss in viscosity upon being heated and in fact, the viscosity increased 11.8% after 17 hours at 60° C.

EXAMPLE 10

Further study of the effect of heating upon the viscosity of the product modified by maleic anhydride showed the results given in the next table. A 12½% solution of the modified product was tested over a period of time.

*Table 10*

| Hours heated at 60° C. | M.P. viscosity | Percent increase viscosity |
|---|---|---|
| 0 | 242.9 |  |
| 17.2 | 272.0 | 12.0 |
| 23.9 | 304.0 | 25.2 |
| 41.0 | 408.0 | 68.0 |

In addition to the reaction bringing about a shift in the isoelectric point, there is apparently another type of reaction taking place. This second reaction appears to be much slower than the isoelectric shift. In view of the fact that maleic anhydride is capable of entering into many types of polymerization and condensation reactions, we believe that some sort of polymerization involving the gelatin has taken place. We do not intend, however, that the scope of our invention be limited to the polymerization theory.

EXAMPLE 11

This example demonstrates the feasibility of producing gelatins of specific viscosity breakdown characteristics by blending the product of Example 9 with its unique viscosity stability with gelatins having varying degrees of viscosity instability. For this purpose a 50:50 blend was made up containing equal weights of the modified products of Examples 1 and 9. These products showed viscosity changes after 17 hours of heating at 60° C. of −14.6 and +11.8%, respectively. The results of viscosity changes are given in the following table over a period of time for both the blend and the modified product of Example 1.

Table 11

| Hours heated at 60° C. | M.P. viscosity | | Percent loss in viscosity | |
|---|---|---|---|---|
| | 50:50 blend | Modified (Ex. 1) | 50:50 blend | Modified (Ex. 1) |
| 0 | 200 | 206.7 | | |
| 17.0 | 192.0 | 176.5 | 4.0 | 14.6 |
| 23.9 | 189.7 | 168.5 | 5.2 | 18.5 |
| 41.6 | 179.4 | 153.6 | 10.3 | 25.7 |

It is, therefore, apparent that our type A product modified with maleic anhydride can be mixed with a gelatin having viscosity instability to give a resultant gelatin of decidedly reduced instability. The relatively unstable gelatin may be regular type A or type B gelatin as well as the various modified type A products disclosed herein. Moreover, maleic anhydride will impart similar viscosity characteristics to any gelatin, including both conventional types A and B.

EXAMPLE 12

2200 parts by weight of a 10% solution of type A porkskin gelatin in water were deanionized by a suitable exchange resin in the customary manner. The deanionized liquor had a pH at 41° C. of 8.4 (undiluted). (This pH was substantially lower than the pH 10 reported above for a similar deanionization under Example 2 because of low-ash content of 0.17% in the present example compared to 1.2% in Example 2.) 1782 parts by weight of this deanionized solution were then treated at 45–50° C. with 4.05 parts by weight of maleic anhydride (2.27% of the weight of gelatin). The pH of the medium fell quickly to a final, steady value of 4.54 at 45° C. The treated solution was then deanionized by an exchanger, the deanionized liquor having a pH of 5.2. This liquor was finally adjusted to pH 5.5 by means of sodium hydroxide (0.08%) and the product was recovered and tested in the usual way. The following table gives the properties of the modified product and the original type A gelatin.

Table 12

| | Original Type A | Modified Type A |
|---|---|---|
| Bloom | 256 | 245 |
| M.P. Viscosity (6⅔% Solution) | 54.7 | 45.7 |
| M.P. Viscosity (12½% Solution) | | 212.4 |
| Percent Viscosity Loss | | [1] +13.4 |
| pH | 4.22 | 5.93 |
| Percent Ash | 0.17 | 0.428 |
| Percent Moisture | 10.00 | 10.10 |
| Isoelectric pH Haze, range | 6.0 to 8.0 | 4.7 to 5.1 |
| Isoelectric pH Haze, max | 7.0 to 8.0 | 4.8 to 5.0 |

[1] Gain.

The viscosity increase is of the same order of magnitude as that of the modified product described under Example 8, in which the anhydride was reacted with the gelatin at a relatively constant pH (5.5 to 6.0).

EXAMPLE 13

In order to learn the effect of prolonged heating at 60° C., a 12½% solution of the modified product of Example 12 in water was investigated, with the following results:

Table 13

| Hours Heated at 60° C. | M.P. Viscosity | Percent Increase In Viscosity |
|---|---|---|
| 0 | 212.4 | |
| 17.3 | 241.4 | 13.6 |
| 23.8 | 275.4 | 29.6 |
| 41.7 | 366.4 | 72.4 |

These results are comparable with those shown in Example 10.

EXAMPLE 14

It is possible to modify type A gelatin with mixtures of the dicarboxylic acid compounds enumerated herein to obtain the desired lowering of isoelectric characteristics. The effects on viscosity stability, however, can be varied quite widely when using maleic anhydride in the mixture, depending upon the order in which the maleic anhydride and the other compound is added. In this and the following two examples the reactions were carried out at relatively constant conditions except for changing the order of addition of succinic and maleic anhydride.

1900 parts by weight of a 10% dispersion of type A porkskin gelatin in water at 50° C. were adjusted to pH 5.6 by sodium hydroxide (1.24% of gelatin). To this mixture was then added over a 20 minute interval 4.37 parts by weight of a 50:50 mixture of succinic and maleic anhydrides in powder form. Simultaneously there was also added sufficient sodium hydroxide (33.2 parts by weight) to hold the pH of the medium at 5.5 to 6.0. Next, the mixture was completely deionized by ion exchange resins. The effluent liquor was at pH 4.8 (50° C. undiluted). Finally the liquor was adjusted to pH 5.5 by sodium hydroxide (0.37%) and the gelatin product was recovered in the usual way. The original type A gelatin and its modified product had the following properties.

Table 14

| | Original Type A | Modified Type A |
|---|---|---|
| Bloom | 260 | 261 |
| M.P. Viscosity (6⅔% Solution) | 52.6 | 48.9 |
| M.P. Viscosity (12½% Solution) | | 228.8 |
| Percent Viscosity Loss | | 3.7 |
| pH | 4.11 | 5.90 |
| Percent Moisture | 10.00 | 11.35 |
| Isoelectric pH Haze, range | 6.0 to 8.0 | 4.7 to 5.2 |
| Isoelectric pH Haze, max | 7.0 to 8.0 | 4.8 to 5.0 |

EXAMPLE 15

1900 parts by weight of a 10% dispersion of type A porkskin gelatin in water at 50° C. were adjusted to pH 5.8 by 1.73 parts of sodium hydroxide. To the adjusted solution were then added in 10 minutes 2.185 parts by weight of maleic anhydride (1.15% of gelatin) along with 1.14 parts of sodium hydroxide to maintain the pH at 5.5 to 6.0. Immediately thereafter was added an equal weight of succinic anhydride, together with 1.16 parts of sodium hydroxide to hold the pH at 5.5 to 6.0. The reacted mixture was then deionized by ion exchangers and the effluent (at pH 5.1) was adjusted to pH 5.6 by sodium hydroxide (0.66 part). The product was recovered in the usual manner and its properties are listed in the following table. Since the same lot of type A gelatin was used in this preparation as was used in Example 14, the preceding table can be referred to for its properties.

Table 15

| | Modified type A |
|---|---|
| Bloom | 259 |
| M.P. viscosity (6⅔%) | 48.9 |
| M.P. viscosity (12½%) | 226.2 |
| Percent viscosity loss | 8.8 |
| pH | 5.75 |
| Percent moisture | 7.39 |
| Isoelectric pH haze, range | 4.6 to 5.2 |
| Isoelectric pH haze, max. | 4.8 to 5.0 |

EXAMPLE 16

1900 parts by weight of a 10% dispersion of type A gelatin in water at 50° C. were adjusted by 1.65 parts of sodium hydroxide to pH 5.7. To this were then added 2.185 parts of succinic anhydride along with 1.18 parts of sodium hydroxide to maintain pH 5.5 to 6.0. Immediately thereafter was added an equal weight of maleic anhydride, together with 1.22 parts of sodium hydroxide to keep the pH at 5.5 to 6.0. As soon as the reaction was completed, the mixture was completely deionized as before (effluent at pH 4.7) and adjusted to pH 5.6 by sodium hydroxide. The properties of the recovered product are tabulated below and reference may be made to Table 14 for the properties of the original type A gelatin.

Table 16

| | Modified type A |
|---|---|
| Bloom | 270 |
| M.P. viscosity (6⅔%) | 50.2 |
| M.P. viscosity (12½%) | 228.8 |
| Percent viscosity loss | 2.8 |
| pH | 5.92 |
| Percent moisture | 9.36 |
| Isoelectric pH haze, range | 4.7 to 5.0 |
| Isoelectric pH haze, max. | 4.8 to 4.9 |

In Examples 14, 15 and 16, as noted before, the anhydrides were used in equal percentages, the total addition in each case being 2.3% (the molecular weight of succinic and maleic anhydrides are so close, 100.07 and 98.06, respectively, that we used them interchangeably). In Example 14 the anhydrides were added together as a mixture. In Example 15 the maleic was added first, followed by the succinic. In Example 16 the order was reversed, the succinic being added first. The routine test results on the three products as reported in Tables 14, 15 and 16 indicated that the modied type A products were quite similar. Yet, when prolonged heating experiments at 60° C. on the products in water (12½% solution) were carried out, the resulting viscosity changes varied considerably as illustrated in the following table.

Table 17

| Hours at 60° C. | Ex. 14 Percent Change Viscosity | Ex. 15 Percent Change Viscosity | Ex. 16 Percent Change Viscosity |
|---|---|---|---|
| 17 | −3.8 | −9.0 | −2.8 |
| 24 | | −10.6 | +1.4 |
| 41 | | −15.6 | +6.8 |
| 48 | +1.0 | −18.0 | +10.2 |
| 65 | +3.4 | −21.6 | +15.4 |
| 72 | +3.2 | −23.0 | |
| 90 | +1.6 | | |

The product from Example 14, after an initial loss of 3.8% at 17.3 hours became quite stable in viscosity, ranging between 1.0 and 3.4% increase up to 90 hours. This variation is within the limits of accuracy of the viscosity heating test. The product from Example 15, on the contrary, showed a tendency to lose viscosity gradually as time increased, the final value after 71.8 hours amounting to a loss of 23%, this being less loss, however than is exhibited by conventional type A gelatin or a modified type A after treatment with succinic anhydride. The product from Example 16, however, gradually increased in viscosity, showing an increase of 15.4% after 65.5 hours. It is quite apparent from all of these results that, in working with mixtures of maleic anhydride and other polycarboxylic compounds, particularly succinic anhydride, the method and order of adding the anhydrides are of prime importance. It will be readily appreciated by those in the art that many advantages and benefits will accrue from gelatin having viscosity characteristics such that on heating the viscosity is constant, increases, or even decreases less than is considered conventional.

We claim:

1. The process of modifying type A gelatin having an isoelectric zone between pH 7 and 9 comprising reacting type A gelatin at a pH range from 3 to 8.5 and a temperature range of 25 to 90° C. with sufficient polycarboxylic acid compound selected from the group consisting of succinic, maleic, phthalic, citraconic, itaconic and aconitic anhydrides and succinyl and fumaryl chlorides and mixtures thereof to lower the isoelectric point of said modified type A gelatin to an ultimate point within the pH range of 4.0 to 5.5.

2. The process as claimed in claim 1 wherein said temperature range is 40 to 60° C.

3. The process as claimed in claim 2 wherein said reacting pH range is 4 to 7.

4. The process as claimed in claim 2 wherein said type A gelatin is admixed with type B gelatin during said reaction.

5. The process as claimed in claim 2 wherein said compound is said mixture thereof and includes said maleic anhydride.

6. The process as claimed in claim 5 wherein said other compound is succinic anhydride.

7. The process as claimed in claim 2 wherein said modified type A gelatin is deionized after said reaction.

8. The process as claimed in claim 7 wherein said type A gelatin is not allowed to reach a pH over 7 and a temperature over 55° C.

9. The process as claimed in claim 2 wherein said type A gelatin is deanionized prior to said reaction.

10. The process as claimed in claim 9 wherein said modified type A gelatin is deionized after said reaction.

11. The process as claimed in claim 3 wherein said compound is succinic anhydride in the amount of 2 to 3% based on the dry weight of said type A gelatin.

12. The process as claimed in claim 3 wherein said compound is maleic anhydride in the amount of 2 to 3% based on the dry weight of said type A gelatin.

13. The process as claimed in claim 3 wherein said compound is succinyl chloride in the amount of 3.5 to 5% based on the dry weight of said type A gelatin.

14. The process as claimed in claim 3 wherein said compound is phthalic anhydride in the amount of 3 to 4% based on the dry weight of said type A gelatin.

15. The process of stabilizing the viscosity loss of a gelatin solution from prolonged heating at 60° C. comprising adding to said gelatin a modified type A gelatin formed by reacting type A gelatin having an isoelectric zone between pH 7 and 9 at a pH range from 3 to 8.5 and a temperature range of 25 to 90° C. with sufficient maleic anhydride to lower the isoelectric point of said modified type A gelatin to an ultimate point within the pH range of 4.0 to 5.5.

16. A modified type A gelatin formed by reacting type A gelatin having an isoelectric zone between pH 7 and 9 at a pH range from 3 to 8.5 and a temperature range of 25 to 90° C. with sufficient polycarboxylic acid compound selected from the group consisting of succinic, maleic, phthalic, citraconic, itaconic and aconitic anhydrides and succinyl and fumaryl chlorides and mixtures thereof to lower the isoelectric point of said modified type A gelatin to an ultimate point within the pH range of 4.0 to 5.5.

17. The product claimed in claim 16 wherein said compound is succinic anhydride in the amount of 2 to 3% based on the dry weight of said type A gelatin.

18. The product claimed in claim 16 wherein said compound is maleic anhydride in the amount of 2 to 3% based on the dry weight of said type A gelatin.

19. The product claimed in claim 16 wherein said compound is a mixture of maleic anhydride and succinic anhydride.

20. The product claimed in claim 16 wherein said compound is phthalic anhydride in the amount of 3 to 4% based on the dry weight of said type A gelatin.

21. The product claimed in claim 16 wherein said compound is succinyl chloride in the amount of 3.5 to 5% based on the dry weight of said type A gelatin.

References Cited in the file of this patent

UNITED STATES PATENTS

| | | |
|---|---|---|
| 2,518,666 | Damschroder et al. | Aug. 15, 1950 |
| 2,520,581 | Turner | Aug. 29, 1950 |
| 2,525,753 | Yutzy et al. | Oct. 10, 1950 |
| 2,580,683 | Kreuger | Jan. 1, 1952 |
| 2,592,263 | Frame | Apr. 8, 1952 |
| 2,692,201 | Conrad et al. | Oct. 19, 1954 |
| 2,719,146 | Schwander | Sept. 27, 1955 |
| 2,827,419 | Tourtellotte et al. | Mar. 18, 1958 |

FOREIGN PATENTS

| | | |
|---|---|---|
| 548,205 | Great Britain | Sept. 30, 1942 |
| 666,593 | Great Britain | Feb. 13, 1952 |